United States Patent [19]

Marshall

[11] 4,323,599
[45] Apr. 6, 1982

[54] METHOD FOR ACHIEVING PARTICLE-TO-PARTICLE CONTACT IN AN ANTIFOULING COATING

[75] Inventor: David W. Marshall, North Reading, Mass.

[73] Assignee: Kennecott Corporation, Stamford, Conn.

[21] Appl. No.: 98,312

[22] Filed: Nov. 28, 1979

Related U.S. Application Data

[60] Continuation-in-part of Ser. No. 46,904, Jun. 8, 1979, abandoned, which is a division of Ser. No. 886,951, Mar. 15, 1978, Pat. No. 4,197,233.

[51] Int. Cl.³ .............................................. B05D 7/22
[52] U.S. Cl. .................................... 427/181; 427/239; 427/388.1; 428/43; 428/328; 428/418; 428/907
[58] Field of Search ................. 428/43, 194, 328, 413, 428/418, 907, 383 R, 356; 427/181, 239, 388.1

[56] References Cited

U.S. PATENT DOCUMENTS 3,983,075  9/1976  Marshall et al. ................. 428/907
4,115,130  9/1978  Crump et al. ..................... 428/907

Primary Examiner—Marion McCamish
Attorney, Agent, or Firm—John L. Sniado; Anthony M. Lorusso

[57] ABSTRACT

Copper flake is treated to remove oxides and other contaminants from its surface and incorporated into an uncured water-insoluble polymer. When applied to a marine structure such as a boat hull, the coating exhibits outstanding anti-fouling properties. The cleaned copper flake is preferably incorporated into an uncured epoxy resin modified by reaction with a polyol. In one embodiment of the invention, the coating is applied and cured underwater using a strippable carrier.

9 Claims, 6 Drawing Figures

METHOD FOR ACHIEVING PARTICLE-TO-PARTICLE CONTACT IN AN ANTIFOULING COATING

CROSS-REFERENCE TO RELATED APPLICATIONS

This application is a continuation-in-part of copending application U.S. Ser. No. 046,904, filed June 8, 1979, now abandoned, which, in turn, is a division of application U.S. Ser. No. 886,951, filed Mar. 15, 1978, now U.S. Pat. No. 4,197,233, issued Apr. 8, 1980.

BACKGROUND OF THE INVENTION

This invention relates to a method for reducing fouling and sliming of submerged objects or marine structures for extended periods of time.

The fouling of boat hulls and other objects immersed in sea water is a well-known problem. Fouling is a term used to describe the damage caused by the growth of certain marine macro-organisms such as barnacles, mollusks, incrusting bryozoans, annelids, hydroides, algae, etc. It is well-known that these organisms are highly susceptible to copper. Accordingly, for centuries sailing vessels have been clad with copper hulls. More recently copper has been applied to hulls in the form of paints, polymers, or copper containing polymers.

Perhaps the most common method of preventing the fouling of a boat hull, particularly on small crafts, is the use of antifouling paints. Such paints are applied to all surfaces of the hull exposed to water for any prolonged period of time. Indeed, even fiberglass hulls, which otherwise do not require painting, are normally painted at the beginning of each boating season with an anti-fouling paint on areas of the hull which will become exposed to water for long periods of time during the boating season. It would, of course, be highly desirable to provide a gel coat for fiberglass hulls which is anti-fouling for several years.

In addition to the prevention of fouling, the present invention can afford resistance to sliming. Sliming is a term used to describe the opaque film which forms on the surface of submerged objects. Sliming is generally caused by microorganisms such as bacteria. Indeed, when a vessel is placed in salt water, initially bacteria becomes associated with the surface of the object to form a film of slime. The association of the bacteria is followed by an association of a biotic progression of diatoms, hybrides, algae, bryozoans, protozoans, and finally macro-organisms (foulents). It is desirable to reduce sliming for many reasons. Obviously, the presence of slime contributes to problems associated with foulents such as increasing drag, increasing fuel consumption, etc. However, perhaps more significant is the fact that macro-organisms tend to be rugophilic and settle on roughened surfaces in preference to smooth surfaces. Thus, there is a view that marine slimes precondition the surface of submerged objects in a manner that stimulates the settling of foulents. Thus, slime provides the physical substrate and possibly a nutrient source which encourages the attachment of macroscopic plants and animals. Obviously, it would be desirable to provide a material which not only prevents fouling but which also reduces sliming. This fact is significant because antifouling paints are not generally characterized as being anti-sliming. The conventional method of preventing sliming is to chemically treat the water, i.e., chlorination or ozonation.

Of course, fouling and sliming is also a problem which occurs when objects are in contact with fresh water. Thus, the present invention is also directed to the coating of objects which remain in contact with fresh water for prolonged periods of time.

As has been stated above, a common procedure for preventing a boat hull from fouling is to apply an antifouling paint. Typically, an anti-fouling paint contains an anti-fouling metal such as copper which leaches into the water to form copper ions. These ions are deadly to the foulents. As one particle of the anti-fouling metal dissolves, another particle is exposed to solvolysis. This leaching is rapid (when compared to the leaching rate of solid copper) and varies with such factors as coating age, temperature of the water, salinity of the water, etc.

In order to fully use the toxicant in an anti-fouling resin, conventional paints depend on the solubility or wearing away of the matrix. This is necessary since most matrices entirely encapsulate the toxic component and, if not soluble, would prevent it from being effective. This mechanism is inefficient since the toxicant is often released into the water before it is entirely consumed.

It has been discovered and disclosed in U.S. Pat. No. 4,197,233 that the antifouling properties of a copper-containing polymeric coating can be enhanced by incorporating the copper in flake form.

SUMMARY OF THE INVENTION

Even more surprising, is the discovery in accordance with the present invention that the antifouling capability of the coating is a function of the cleanliness of the surface of the flake when incorporated into the polymer. Accordingly, the present invention provides a method which reduces fouling by providing copper in flake form, cleaning the copper flake to remove substantially all contaminating surface deposits, mixing the cleaned copper flake with an uncured water-insoluble polymer, applying the mixture to the surface to be protected, and curing the coating. A sufficient amount of copper flake is utilized so the entire thickness of the coating (gel coat) is electrically conductive. This method provides a coating from which the copper is only very slowly leached, yet provides the desired antifouling effect.

The preferred polymer which forms the gel coat is a conventional epoxy resin modified with an epoxidized polyol. This formulation, in addition to exhibiting outstanding anti-fouling properties, exhibits anti-sliming properties when utilized as a gel coat on an object exposed to sea water. The formulation is flexible, has excellent adhesive properties, contains no solvents, and can be either molded or spread as a coating.

In one important embodiment of the invention, an underwater type hardener is used thus enabling the plugging of holes in copper clad hulls and the like while the hulls are in water.

Accordingly, it is an object of the invention to provide a method for protecting objects exposed to salt water against fouling.

Another object of the invention is to provde antifouling protection for conduits, pipes and the like used to transport water.

DESCRIPTION OF THE PREFERRED EMBODIMENTS

Figure 1:
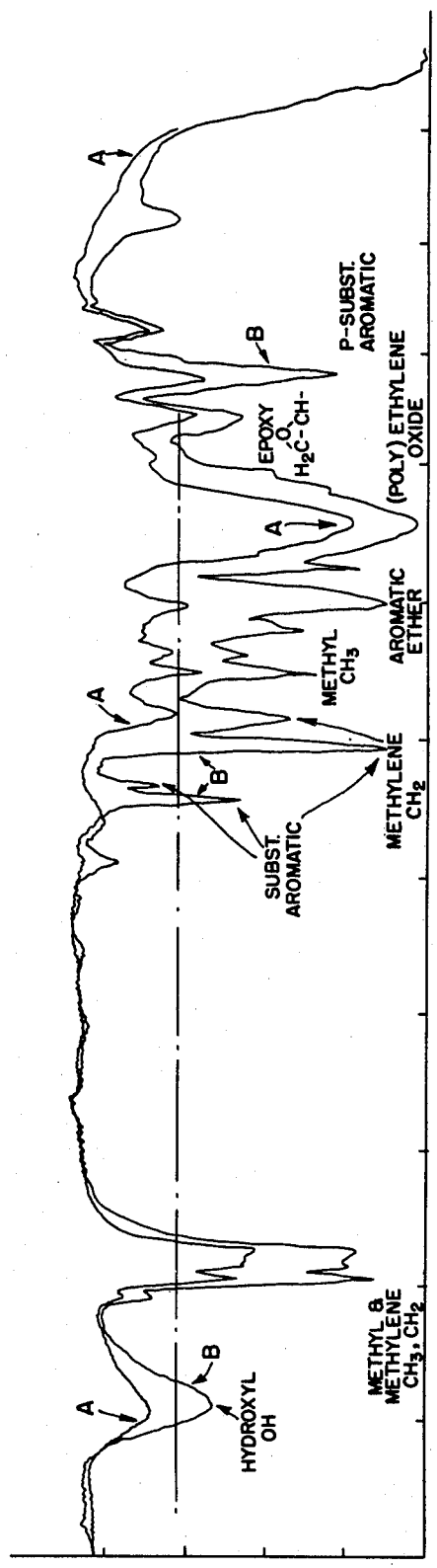
FIG. 1 is a graph showing an infrared analysis of two commercial epoxidized polyols used as modifiers in the anti-fouling and antisliming formulations, curve labeled A is Dow Chemical's D.E.R. 732, curve B is Ciba-Geigy's Araldite 508.

At the outset, the invention is described in its broadest overall aspects with a more detailed description following.

In its broadest aspect, the present invention relates to a method of coating water pipe interiors and marine structures with an uncured polymer admixed with a clean-surfaced copper flake for protection against sliming and fouling. In the preferred embodiment the coating applied is an epoxy resin, modified by inclusion of a group such as polyol, and containing the cleaned copper flake.

The Copper Flake

In order to provide the desired anti-fouling effect, it is important that the coating applied in accordance with the present invention contain a sufficient amount of copper flake so that the entire thickness of the gel coat is electrically conductive. The electrically conductive amount of copper may vary from about 25% by weight to about 60% by weight. Less than 25% copper appears to result in a resin where particle-to-particle contact does not exist; greater than 60% copper results in a resin too viscous with which to work. For anti-fouling use the optimum range appears to be from 45% copper to 60% copper. With less than 45% there does not appear to be sufficient toxicant to be an effective anti-foulant.

It is also important that the copper flake be treated or cleaned to remove surface impurities and/or oxides. Details of this treatment appear below and can also be found in U.S. Pat. No. 3,983,075 to Marshall et al. entitled "Copper Filled Conductive Epoxy", the teachings of which are incorporated herein by reference. The choise of cleaning agent will be dictated, in part, by the nature of the surface deposits to be removed which, in turn, reflect the method by which the flake was manufactured and stored. Thus, the nature of the cleaning agent is not part of the invention per se. However, one cleaning treatment found to be particularly effective involves contacting the flake with an organic solvent and with an acid in separate steps, as described in more detail in U.S. Pat. No. 3,983,075.

Copper flakes having a particle size of 30 to 200 microns are suitable. Copper flakes such as Belmont Smelting and Refining Company's No. 250 flake copper (a 250 mesh approximately 58 microns particles size copper flake with a purity of at least 99.99% copper) are mixed with enough of a solvent such as chlorinated alkylenes, e.g., trichloro ethylene, so that eight volumes of a solvent are used per unit volume of flakes. Higher ratios can be used, (up to 12 volumes of solvent per unit volume of flakes); but, it has been found that generally sufficient cleaning is achieved by utilizing additional aliquot parts rather than employing greater amounts of the solvent. For example, by using a solvent flake ratio of 5:1 and by repeating the process, it has been found that the cleaning action is enhanced.

The obtained mixture is stirred for about ½ hour and then filtered through an appropriate filter device such as a Buchner funnel. After filtering, the flakes are rinsed in the funnel several times with denatured alcohol, methyl alcohol, or ethyl alcohol. After the first step, the copper flakes while still damp with alcohol are removed from the funnel and mixed with about 1 quart of 1 molar citric acid and stirred continuously for a prolonged time, e.g., for about 12 hours. This mixture is again filtered in the funnel and rinsed thoroughly with distilled water until the rinse solution is clear. Again, the flakes are rinsed with denatured alcohol and filtered to remove the excess fluid. Drying of the damp copper flakes is carried out in a vacuum oven and generally a temperature at about 100° F. is employed. It has been found that the flakes are dry and powdery after drying; but, it is important that these flakes be stored in a clean dry container until ready for use. It is also important that moist air be excluded from the storage vessel because of the tendency of copper to oxidize readily.

In addition to haloalkylene solvents having 1-3 carbon atoms, suitable cleaning solvents include ethers such as dimethyl ether, diethyl ether, ketones such as acetone and methyl ethyl ketone and aromatics such as benzene and toluene. Other acids suitable for the purpose include dilute mineral acids, e.g., nitric acid (about 5% by weight), tricarballylic acid, tartaric acid and similar polycarboxylic acids, i.e., aliphatic carboxylic acid having from 1 to 4 carboxylic groups and from 0 to 4 hydroxy groups and ranging from 3 carbon atoms (tartonic acid and tricarballylic acid) and up and, in general, an aliphatic acid of at least 2 carboxylic groups.

The concentration of the acid in the solvent should be from 0.1 molar to a saturated solution although concentrations greater than about 2 molar are probably wasteful.

The Epoxy Resin

In general, epoxy resins (also called epiepoxide, and ethoxyline resins), are the condensation products of epichlorohydrin with diphenols, such as bisphenol A, and have the structure shown below.

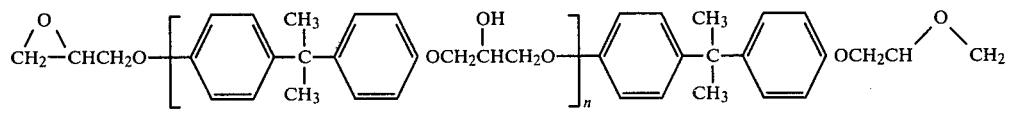

The molecular weights of these resins is in the range of 360–4000. The resins, in the illustrated uncured state, are thermoplastic and range from low viscosity liquids (n=0) to high melting point brittle solids (n=10). An epoxy resin may be defined as a polyether containing a highly reactive epoxy or oxirane group at each terminal, separated by an alternating aromatic and aliphatic system containing hydroxyl groups.

The epoxide group behaves as a highly unsaturated system; and therefore, can react by addition with a wide variety of materials, especially those containing polar (active hydrogen) groups. Hence, except for being much more reactive, the epoxy group acts in a manner very similar to that of an olefin.

Epoxy resins useable in the present invention have a low viscosity 100-20,000 cps, although resins having viscosity less than 12,000 are preferred since they allow higher loadings of a filler material such as the copper flakes. Commercially available epoxy resins suitable for use in the present invention include:

| Manufacturer | Resin Name |
| --- | --- |
| Ciba-Geigy | Araldite 507 |
| | Araldite 502 |
| | Araldite 6004 |
| | Araldite 6005 |
| Shell Chemical | Epon 815 |
| | Epon 826 |
| | Epon 820 |
| Dow Chemical | D.E.R. 334 |
| | D.E.R. 335 |
| | D.E.R. 321 |
| | D.E.R. 332 |
| Celanese | Epi-Res 504 |
| | Epi-Res 5077 |
| | Epi-Res 5091 |
| General Mills | Gen Epoxy M170 |
| | Gen Epoxy M189 |
| | Gen Epoxy M245 |
| | Gen Epoxy 175 |

The Polyglycol

As previously noted, in the preferred embodiment of the present invention a reactive group such as a polyglycol (polyol) is included in the cured epoxy resin which, when in the presence of sea water, will react with copper to complex it. It is believed that this reactive group is not completely reacted with the epoxy resin and hence, some of the —OH groups are able to provide a synergistic effect by reaction with the copper flake, in the presence of sea water, to form either a basic cupric carbonate $CuCO_3Cu(OH)_2$ or cupric butyrate $Cu(C_4H_7O_2)_2 \cdot 2H_2O$ or some other metal-organic compound which depends on the structure of the polyglycol. It is believed that the copper complex prevents sliming. At this point, it should be noted that the purpose of the polyglycol is to create a reaction product which inhibits slime formation. Epoxy resins containing polyglycols are available commercially. A representative list of such resins appears below:

| Manufacturer | Trade Name | Equivalent Epoxy Weight |
| --- | --- | --- |
| Ciba-Geigy | Araldite 508 | 400-455 |
| Dow Chemical | D.E.R. 732 | 305-335 |
| Dow Chemical | D.E.R. 736 | 175-205 |
| General Mills | Gen Epoxy G-192 | 175-205 |
| General Mills | Gen Epoxy G-320 | 305-335 |

As used throughout this specification and claims, all percentages and parts are by weight unless otherwise specified.

The equivalent epoxy weight is the weight of a molecule per epoxy reactive group. For example, if a resin contains 2 epoxy groups per molecule, the equivalent epoxy weight is the weight of the molecule divided by 2. As is known in this art, the equivalent epoxy weight is utilized in order to ascertain the correct amount of curing agent.

The preferred resin is Araldit 508 which is an epoxy resin containing polypropylene glycol glycidyl ether. This resin has the following generalized formula:

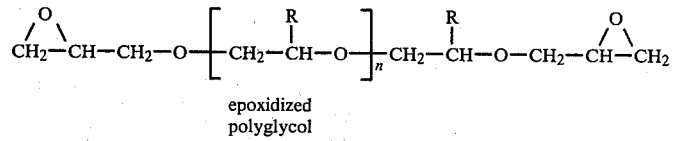

epoxidized polyglycol where n is a number between 2-7, the epoxidized polyglycol resin has a molecular weight between the range of 260-1000, and R is hydrogen or an aliphatic hydrocarbon containing 1-6 carbons.

Curing Agents

As is well known, epoxy resins can be cured with amines, amides, anhydrides, or catalytic agents such as boron trifluoride complexes and other Lewis acids.

The amine may be an aliphatic amine such as diethylenetriamine, diethylaminopropylamine, or triethylenetetramine.

Polyamides are also useable as curing agents. In general, the ratio of the epoxy to the curative such as polyamides curative is 70 parts of epoxy to 30 parts of polyamide. However, ratios as low as 50 epoxy to 50 polyamide and as high as 80 epoxy to 20 polyamide can be used.

More specific details on the curing agent appear below.

Aliphatic amines Triethylene Tetramine (TETA) is an aliphatic amine usually used in the ratio of 13 parts by weight to 100 parts resin. Other aliphatic amines such as diethylenetriamine (DETA) aminoethylethanolamine, tetraethylenepentamine, diethylaminopropylamine and the like would also be satisfactory. Proportions of amine to resin can vary from about 2 phr to 100 phr depending on the particular aliphatic amine chosen. Those that cure completely at room temperature such as TETA and DETA are used in proportions less than 15 prh and are preferred since elevated temperatures are not needed to cure the resin and the volume of the curing agent is not enough to cause excessive dilution of the copper filled resin. "phr" indicates parts per 100 parts resin.

Ancamine 1510 is a modified cycloaliphatic amine made by Pacific Anchor Chemical Corporation. It has a very low viscosity (0.5 centapoise) and results in a more fluid anti-fouling compound. Similar compounds are Ancamine MCA and Ancamine 1561. Ancamine 1510 is recommended to be used at 30 phr but may be used from 20–40 phr with slightly reduced physical properties.

DMP-30 is the aromatic-ring-containing aliphatic tertiary amine, tris (dimethylaminomethyl) phenol. It is used in the range of 6 to 10 phr for room temperature cures with 10 phr being the preferred composition. Benzyldimethylamine, α-methylbenzyldimethylamine and dimethylaminomethylphenol are acceptable substitutes.

Other Additives

Because availalbe epoxy resins modified with glycols such as Araldite 508 tend to be soft when cured with an amine, it is advantageous to include an unmodified epoxy resin in the formulation. For example, the resin D.E.R. 332 has been included in a formulation as follows:

| | | |
|---|---|---|
| Araldite 508 | 70g | |
| D.E.R. 332 | 30g | |
| TETA | 3g | |

Other additives include:

Epodil L is a non-reactive liquid hydrocarbon resin that is used primarily as a viscosity reducing diluent. It can be used up to 50% by weight with any resin, but the recommended range is 10–15% by weight.

The Polymer

The polymeric composition is prepared in accordance with procedures that are well known in this art. Prior to being cured however, the copper flake is added to the reactive mixture. Tests have indicated that to be effective as an anti-fouling coating, a gel coat must contain at least 45% and preferably 50% or more by weight copper. With this amount of copper in the polymer, it would be electrically conductive.

Curing agents would be used in their normal proportions which are readily available in the literature. Thus, for example, for an amine curing agent, the literature suggests using 2–50 parts of amine per 100 parts of an epoxy resin. In general, the curing can be effected from room temperature or up to a temperature of 250° F. A cure at room temperature is achieved at 70° F. for a cure period of 16 hours. Although the resins will harden within this time period, further curing will continue for several weeks or longer. Curing can be accelerated by adding small amounts of tertiary amines or by heating to about 150° F.

Anhydride cured resins are usually cured at a higher temperature such as for 2 hours at 200° F. plus an additional overnight cure at 250° F. and a post cure of 4 hours at 350° F. It has been found, however, that short and lower temperatures cure conditions reduce the possible oxidation of the flakes. At cure temperatures above 250° F., the electrical conductance of the resin is impaired.

The use of copper filled electrically conductive epoxy resins at anti-fouling coatings in accordance with the invention as set forth in U.S. Pat. No. 4,197,233 was tested. Initially, twelve formulations were coated on 4 inch by 6 inch fiberglass plates and placed in sea water test racks at Woods Hole, Buzzards Bay, and Winthrop Harbor, Massachusetts. Seven of these initial twelve formulations showed significant fouling resistance and the best six were placed in new racks along with several other formulations.

The formulations tested are listed in Table I. Variations of resin type and copper content were evaluated. After the first year of testing, it became apparent that copper contents of less than 35% were not anti-fouling and that 45% copper was marginal in most cases.

Flake size was also varied. A coarse flake, U.S. Bronze's C-100 (~100 mesh), a fine flake, USB 6500 (~325 mesh), and a 50—50 mixture of the two were used in several different formulations. The USB 6500 and the blend were tested for only one season, and no differences were apparent.

Table II summarizes the results of the three test sites. In general, the specimens at Mass. Maritime (Buzzards Bay) were not as heavily fouled as those at Woods Hole and Winthrop Harbor. The relative difference between specimens was the same however (i.e., the least fouled at Mass. Maritime was the least fouled at the other sites). There were differences in the fouling organisms at all three sites. Winthrop Harbor fouled the racks heavily with mussels, a greenish sludge and numerous round jellylike organisms. Woods Hole fouled more heavily with algae, barnacles, and a flat jelly-like organism. Mass. Maritime had tube worms which were not present at either of the other two sites.

Two formulations looked particularly good after a two year exposure. They are formulations 3 and 4. Both contain 55% copper. Formula 3 showed moderate fouling at Winthrop Harbor after the second year but did not foul at either of the other two sites. At the Winthrop site, only the bottom ½ of the sample fouled significantly. The bottom ½ had previously been sanded to present a smoother surface. It is possible that the sanding smeared some of the resin over the exposed copper although no difference between top and bottom were noticed at the other test sites.

Formulation 4 showed no evidence of fouling at any of the test sites and also seemed to collect significantly less slime than the other formulations. This formulation is the only formulation that contains a polyglycol. Several other polyglycol containing resins were made and after one fouling season they all remain unfouled and had very little slime.

Formulation 8 which was thinned to make a flowable system that could be painted or sprayed showed no fouling after one year.

Substituting a conductive carbon black for copper in one of the better anti-fouling formulations showed that the copper was essential. Formulation 18 containing only carbon black fouled heavily.

Long anti-fouling life was expected for the formulations which show good electrical conductivity since this is taken to be an indication of particle-to-particle contact throughout the thickness of the piece. The resistance of several formulations was measured prior to placing the samples at the various test sites. The values are presented in Table III. There does not appear to be a direct correlation between conductivity and fouling resistance. However, there is a correlation between copper content and performance if the data in Table II is examined. It is likely that within a given copper filled formulation conductivity and fouling are related since in this case conductivity is related to copper content.

There are 10 formulations which have shown no fouling after one season of exposure at all three test sites.

TABLE I

Test Formulations

| Formulations | | Parts | Variations A | B | C |
|---|---|---|---|---|---|
| (1) | Araldite 507 | 100 | 100 | 100 | 100 |
| | TETA | 13 | 13 | 13 | 13 |
| | USB C-100 | 138 | 92 | 61 | 138 untreated |
| (2) | Araldite 6005 | 100 | 100 | 100 | |
| | Ancamine 1510 | 30 | 30 | 30 | |
| | USB C-100 | 158 | 106 | 70 | |
| (3) | Araldite 6005 | 100 | 100 | 100 | |
| | Epodil L | 15 | 15 | 15 | |
| | TETA | 13 | 13 | 13 | |
| | USB C-100 | 156 | 104 | 69 | |
| (4) | Araldite 508 | 100 | | | |
| | Araldite 6005 | 42.8 | | | |
| | TETA | 18.4 | | | |
| | USB C-100 | 202.8 | | | |
| (5) | Araldite 6005 | 100 | | | |
| | Thiokol LP3 | 50 | | | |
| | DMP-30 | 10 | | | |
| | USB C-100 | 196 | | | |
| (6) | Araldite 507 | 100 | | | |
| | TETA | 13 | | | |
| (7) | Araldite 507 | 100 | 100 | | |
| | TETA | 13 | 13 | | |
| | USB 6500 | 138 | 138 untreated | | |
| (8) | Araldite 507 | 100 | | | |
| | TETA | 13 | Flowable | | |
| | USB C-100 | 138 | Formulation | | |
| | Methyl Alcohol | 80 | | | |
| (9) | Araldite 507 | 100 | No alcohol wash | | |
| | TETA | 13 | used in treating | | |
| | USB C-100 | 138 | the flake. | | |
| (10) | DER 332 | 100 | | | |
| | Epicure 8071 | 28 | Cured | | |
| | Epicure 874 | 4 | underwater | | |
| | USB C-100 | 160 | | | |
| (11) | DER 332 | 100 | | | |
| | Araldite 850 | 70 | Cured underwater | | |
| | USB C-100 flake | 200 | | | |
| (12) | Araldite 508 | 100 | | | |
| | DER 332 | 43 | | | |
| | TETA | 18 | | | |
| | USB 6500 | 200 | | | |
| (13) | Araldite 507 | 100 | | | |
| | TETA | 13 | | | |
| | USB C-100 | 57 | | | |
| | USB 6500 | 56 | | | |
| (14) | ERL 2772 | 100 | | | |
| | Epodil L | 15 | | | |
| | TETA | 13 | | | |
| | USB C-100 | 64 | | | |
| | USB 6500 | 64 | | | |
| (15) | DER 332 | 50 | | | |
| | DER 732 | 50 | | | |
| | TETA | 13 | | | |
| | USB C-100 | 69 | | | |
| | USB 6500 | 69 | | | |
| (16) | Uncoated fiberglass | | | | |
| (17) | Devcon underwater curing Epoxy | | | | |
| (18) | Araldite 507 | 100 | | | |
| | TETA | 13 | | | |
| | XC 72R Carbon Black | 51 | | | |
| (19) | Araldite 507 | 100 | | | |
| | XU 213 | 3 | Heat cured | | |
| | USB C-100 | 63 | system | | |
| | USB 6500 | 63 | | | |
| (20) | Teflon sheet | | | | |
| (21) | Araldite 507 | 100 | Flattened under a | | |
| | TETA | 13 | polyethylene sheet | | |
| | USB C-100 | 144 | to give a smooth surface. | | |
| (22) | DER 332 | 50 | | | |
| | DER 732 | 50 | Glycol containing | | |
| | Araldite 850 | 70 | underwater curing | | |
| USB C-100 | | 200 | resin | | |

USP C-100 and USB 6500 are tradenames for copper flake sold by U.S. Bronze Corp. USB C-100 is a 100 mesh copper flake and USB 6500 is a 325 mesh copper flake.

TABLE II

Fouling Results

| Formulation | Woods Hole | Mass. Maritime | Winthrop Harbor | Comments |
|---|---|---|---|---|
| 1 | N, LF | N, LF | N, MF | Mass. Maritime & Woods Hole had only one organism on each plate after 2 years |
| 1A | N, MF | N, MF | N, MF | loose attachment |
| 1B | F | F | F | low Cu (35%) |
| 1C | N | N | N | |
| 2 | N, MF | N, MF | N, F | loose attachment |
| 2A | LF | LF | LF | 45% Cu |
| 2B | F | F | F | 35% Cu |
| 3 | N, N | N, N | N, MF | Bottom ½ only fouled |
| 3A | N | N | N | 45% Cu |
| 3B | LF | LF | F | 35% Cu |
| 4 | N, N | N, N | N, N | less sliming than most |
| 5 | N, LF | N, N | N, MF | more slime than most |
| 6 | F | F | F | no copper |
| 7 | N | N | N | |
| 7A | LF | N | N | one barnacle on W.H. sample |
| 8 | N | N | N | Light edge growth on one sample |
| 9 | N | N | N | |
| 10 | MF | N | MF | underwater cure |
| 11 | LF | N | LF | mostly grass |
| 12 | N | N | N | very little slime |
| 13 | N | N | N | green |
| 14 | N | N | N | light slime, green, 50% Cu |
| 15 | — | N | — | Contains polyglycol as does formula 4 |
| 16 | F | F | F | control |
| 17 | F | F | F | no Cu, underwater cure |
| 18 | F | F | F | no Cu, contains carbon black |
| 19 | N | N | N | heat cured system |
| 20 | F | F | F | Teflon |
| 21 | N | N | N | 56% Cu, cured under polyethylene to give a smooth surface. |

(If two sets of letters are given, the first is for the first year of test, the second for the end of 2 years.)
F = Fouled
N = No Fouling
LF = Light Fouling
MF = Moderately Fouled

TABLE III

Electrical Conductivities of Anti-fouling Formulations

| Formulation No. | *Resistance (ave. 3 values) |
|---|---|
| 1 | 0.3 ohms |
| 1C | >500 K |
| 7 | 0.3 |
| 7A | >1000 K |
| 9 | 0.5 |
| 10 | 1.2 |
| 11 | 50.0 |

TABLE III-continued

| Electrical Conductivities of Anti-fouling Formulations | |
|---|---|
| Formulation No. | *Resistance (ave. 3 values) |
| 12 | 1.2 |

*Between test probes a 3" span on actual test specimens.

The foregoing tests conducted in accordance with the invention set forth in U.S. Pat. No. 4,197,233 indicate that in order for the polymer to be anti-fouling it should contain 50% or more by weight of copper. A test sample with this amount of copper will have an electrical resistance of less than 50 ohms. The tests also indicate that only a gel coat which contains a glycol has significant anti-sliming properties.

The present invention is further illustrated by the following non-limiting examples.

A second series of tests was conducted in accordance with the present invention to determine the effect of cleaning copper flake, prior to incorporation into the epoxy resin. In this series of tests, the coatings were applied to test panels submerged for five months at Indian Rocks, Fla. These panels were 4-inch×6-inch fiberglass reinforced polyester sheets, ⅛ inch thick. They were coated on one side with the test formulations. The following formulations were respectively applied to 6 test panels:

TABLE IV

| Formula 1 | |
|---|---|
| Araldite 507 | 100 |
| Triethylene tetramine | 13 |
| USB C100 (treated copper flake) | 138 |
| Formula 1A | |
| Same as Formula 1 except the copper flake was untreated | |
| Formula 7 | |
| Araldite 507 | 100 |
| Triethylene tetramine | 13 |
| USB 6500 (treated copper flake) | 138 |
| Formula 7A | |
| Same as Formula 7 except the copper flake was untreated | |
| Formula 23 | |
| Araldite 507 | 100 |
| Triethylene tetramine | 13 |
| USB C100 ⎱ treated | 69 |
| USB 6500 ⎰ copper flake | 69 |
| Formula 23A | |
| Same as Formula 23 except the copper flake was untreated | |

In the "A" series of formulations the commercial copper flake (USB C-100 and USB 6500) was used as received from the U.S. Bronze Corp. In the case of the other three formulations the copper flake was first cleaned generally as described at pages 7 and 8 of this specification, including two washes with trichloroethylene at room temperature (5:1 solvent to flake ratio each wash), a rinse with denatured alcohol, one wash at room temperature with 1 quart of 1 molar citric acid per pint of flake, a final rinse with denatured alcohol and drying. The results for the 5 month exposure to sea water are summarized in Table V.

TABLE V

| Formulation | Fouling |
|---|---|
| 1 | none |
| 1A | light fouling |
| 7 | none |
| 7A | moderate fouling |

TABLE V-continued

| Formulation | Fouling |
|---|---|
| 23 | none |
| 23A | moderate fouling |

These tests show, unexpectedly, that effectiveness against fouling is a function of the cleanliness of the copper flake incorporated into the resin.

As has been stated above, one embodiment of the gel coat of the present invention can be cured under water. Details on this embodiment appear below.

An ordinary bisphenol A based epoxy resin is mixed with treated copper flake. The mix is then blended with a hardner which will cure underwater such as Ciba-Geigy's hardner 850 or Celanese's Epicure 8071 and 874 (see test formulations 10 and 11). The mixed resin is then placed on a plastic film such as polyethylene from which it can be transferred by a diver or some mechanical mechanism to the surface of the underwater object to be coated. After a 24 hour cure, the polyethylene can be stripped away leaving the copper-resin surface exposed.

A glycol containing anti-sliming formulation is illustrated in formulation #22.

From the foregoing it should be clear that an essential requirement of the gel coat of the present invention is that it comprise a cured resin containing 50% or more of copper flake which has been treated to remove copper oxides. It is preferable that the copper flake be of the size between the range of 100–325 mesh (U.S. Sieve Series). It is also preferable that the resin be an epoxy resin of the bisphenol A type. For embodiments of the invention where anti-sliming properties are also desirable, a polyol is included in the epoxy formulation. In such cases, the polyol should comprise between 5–30 weight percent of the total gel coat composition, that is 5–30% of the total weight of the resin, additives, and the copper. It is also desirable that the polyol (polyglycol) that is selected for inclusion in the epoxy resin be such that the epoxy equivalent weight range of the polyglycol is 100–500.

As has been stated above, the resin or gel coat of the present invention is utilized to provide anti-fouling properties to water craft and conduits. The term "water craft" is used in its broadest sense and is intended to cover any object which floats or is immersed in water. Thus, "water craft" is intended to cover stationary pilings for piers, buoys of all sizes as well as ship hulls. Likewise, the term "conduit" is intended to describe any tube or tubular structure. Thus, the gel coat or resin of the present invention can be utilized to coat large tunnels used, for example, in nuclear power plants to conduct cooling sea water as well as the smallest tubing which might also be utilized to deliver sea water from one place to another.

Figure 2:
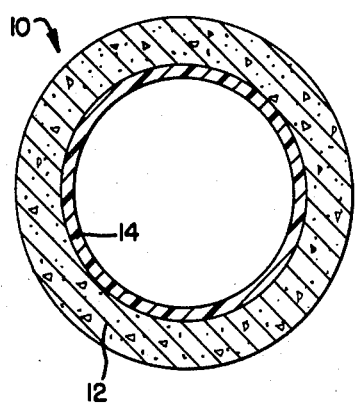
FIG. 2 is a view of a concrete tunnel which is lined with an anti-fouling coating in accordance with the present invention.

An example of a utility intake tunnel is shown in FIG. 2. Such structures can be coated with a resin in accordance with the present invention to make them anti-fouling. For example, a 6 foot diameter utility cooling water tunnel 10 formed from concrete 12 can be coated with a gel coat in accordance with the present invention. The accomplish the foregoing, formulation 4 is applied to the tunnel 10 by spraying it on the inside wall of the tunnel. This technique is commonly used by boat manufacturers. The spraying would be continued until a coating 14 approximately 1/16th of an inch thick resulted.

Of course, smaller conduits can be coated with the epoxy of the present invention by techniques well known in this art. For fiberglass reinforced plastic piping, the resin can be troweled onto the mandrel used to manufacture the pipe.

Figure 3:
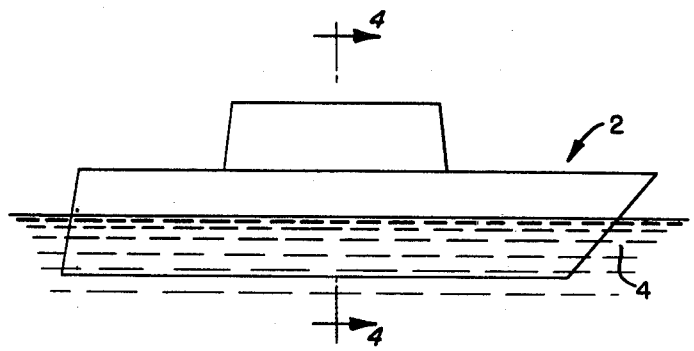
FIG. 3 is a view of a boat hull which has been coated by the method of the present invention.
Figure 4:
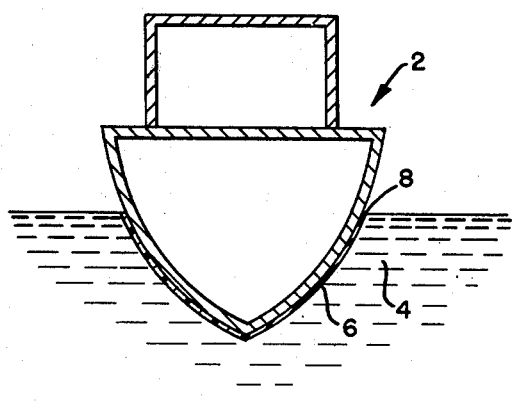
FIG. 4 is a cross-sectional view taken along line 4—4 of FIG. 3.

FIG. 3 shows a boat having a gel coat in accordance with the present invention and FIG. 4 is a cross-sectional view taken along line 4—4 of FIG. 3. Referring more specifically to the drawing, the boat 2 in water 4 has a coating 6 of the gel coat of the present invention below the water line 8. The procedure for coating such a boat hull is similar to the procedure utilized for coating the intake tunnel. In this case a formulation such as formulation 4 is sprayed into a female mold. The backing resin is then put into the mold and the glass mat is applied to form the hull.

Figure 5:
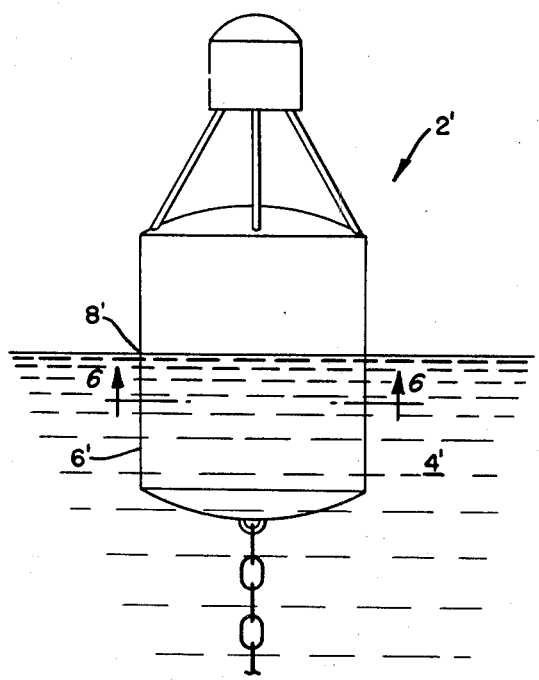
FIG. 5 is a view of a navigational bouy which has been coated by the method of the present invention; and, FIG. 6 is a cross-sectional view taken along line 6—6 of FIG. 5.
Figure 6:
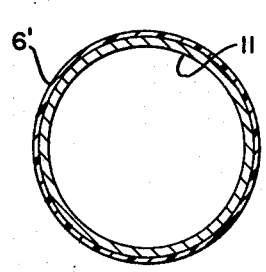

The present invention can be utilized to coat navigational bouys as well as other floats. A significant problem which develops when navigational bouys are in the water for any prolonged period of time is that they become so fouled that they are weighted down to a point where they must be removed from the water, scraped, and repositioned. This, of course, is an expensive operation. By coating navigational bouys and other floats with the gel coat of the present invention, the bouys do not require tending as frequently as they would otherwise require. FIG. 5 shows a bouy having a gel coat in accordance with the present invention and FIG. 6 is a sectional view along line 6—6 of FIG. 5. Referring more specifically to FIGS. 5 and 6, the bouy 2' in water 4' has a coating 6' of a gel coat in accordance with the present invention below the water line 8'. Such bouys can be made anti-fouling by either spraying or troweling the resin 6' and allowing it to cure over the substrate 11. Of course, because of the high copper content of the gel coat, it would not be applied directly over steel, since this arrangement could produce galvanic action which would corrode the buoy. For this reason an insulative primer such as a conventional coal tar epoxy is used to coat the steel. Smaller bouys and floats can be simply dipped into the gel coat before it is cured and then allowed to cure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for controlling fouling of the surface of a water pipe interior or a submergible or submerged marine structure by applying a copper-containing polymeric coating, said method comprising:
    (a) providing the copper in flake form;
    (b) cleaning the copper flake to remove substantially all contaminating surface deposits;
    (c) mixing the cleaned copper flake with an uncured water-insoluble polymer;
    (d) applying the mixture as a coating onto the surface of the water pipe interior or submergible or submerged marine structure; and
    (e) curing the coating.

2. The method of claim 1 wherein said water-insoluble polymer is an epoxy or polyester resin.

3. The method of claim 1 wherein said water-insoluble polymer is an epoxy resin modified with an epoxidized polyol.

4. The method of claim 3 wherein the copper flake is incorporated into the resin in a quantity sufficient to render the entire thickness of the coating electrically conductive.

5. The method of claim 4 wherein the copper flake constitutes 25% to 60% by weight of the uncured mixture.

6. The method of claim 1, 3 or 4 wherein the cleaning is accomplished by contacting the coper flake with an organic solvent and an acid.

7. The method of claim 6 wherein said solvent is selected from the group consisting of haloalkylenes of 1-3 carbon atoms, ethers, ketones and aromatic solvents and said acid is selected from the group consisting of dilute mineral acids and polycarboxylic acids.

8. The method of claim 1, 3 or 4 wherein the coating is applied to a boat hull.

9. The method of claim 1, 3 or 4 wherein the mixture is first applied as a coating to a strippable carrier, then the coating is contacted against an underwater surface and the carrier is stripped off after the coating is cured.

* * * * *